(12) United States Patent
Buzzi

(10) Patent No.: US 6,544,619 B1
(45) Date of Patent: Apr. 8, 2003

(54) DIFFERENTIATED SANDWICH LAMINATE

(75) Inventor: Fabio Buzzi, Oggiono (IT)

(73) Assignee: FB Design S.r.l., Brianza (IT)

( * ) Notice: Subject to any disclaimer, the term of this patent is extended or adjusted under 35 U.S.C. 154(b) by 4 days.

(21) Appl. No.: 09/712,515

(22) Filed: Nov. 14, 2000

(30) Foreign Application Priority Data

Nov. 16, 1999 (IT) .......................................... MI99A2391

(51) Int. Cl.[7] .................................................. B32B 3/12
(52) U.S. Cl. ........................ 428/76; 428/116; 428/192; 428/223; 428/317.1; 428/318.6
(58) Field of Search ................................ 428/223, 116, 428/317.1, 318.6, 192, 76

(56) References Cited

U.S. PATENT DOCUMENTS 5,520,999 A    5/1996    Van Skyhawk et al.

FOREIGN PATENT DOCUMENTS

EP    0310935    12/1989

OTHER PUBLICATIONS

European Search Report, dated May 22, 2000.
Abstract of European Pat. Appln. No. 0,310,935.

*Primary Examiner*—Elizabeth M. Cole
(74) *Attorney, Agent, or Firm*—Abelman, Frayne & Schwab

(57) ABSTRACT

Described herein is a differentiated sandwich laminate (comprising an outer layer, an intermediate layer or "center", and an inner layer), in which the resin used for making the outer layer is different from, and incompatible with, the resin used for making the inner layer.

The inner layer and outer layer of sandwich laminate of the adjacent layers of two different sandwich laminates, made according to the invention, are made to adhere in a water-tight manner to each other using mechanical-assembly means.

11 Claims, 2 Drawing Sheets

DIFFERENTIATED SANDWICH LAMINATE

SCOPE OF INVENTION

The invention consists in a differentiated sandwich laminate (comprising an outer layer, an intermediate layer or "centre", and an inner layer), in which the outer layer is made using a type of resin that is different from, and incompatible with, the resin used for making the inner layer.

The inner layer and outer layer of sandwich laminate or the adjacent layers of two different sandwich laminates, made according to the invention, are made to adhere together in a watertight manner using mechanical-assembly means (bolts, rivets, etc.).

PRIOR ART

Composite materials, i.e., materials consisting of a resin (or other equivalent material) in which are embedded fibres of a chemically inert material (e.g., glass fibre), preferably in the form of one-directional layers and/or cloths made using the said material, are well known in the state of the art and are widely used for making (relatively) light structural elements presenting high characteristics of resistance. One of the fields in which composite materials have been used most successfully (principally, but not exclusively, in the nautical sector) is in the production of the so-called <<sandwich laminates>>, which are characterized by a pair of layers of composite material (also known in the art of the sector as <<skins>>), which are thin and strong and are applied on the opposite faces of a (somewhat thick) central body called <<centre>>; the <<skins>> are fixed to the central body by means of an adhesive material designed to transmit the loads applied to the <<skins>> onto the central body.

The <<skins>> are in turn obtained by rolling, i.e., by superimposing and getting to adhere together a number of elementary layers of a composite material consisting of a supporting fibrous material embedded in a matrix made of resin (or other equivalent material).

The methods used (or that may be used) for making a sandwich laminate will not be described herein because they are in themselves known and are in any case extraneous to the present invention.

Sandwich laminates are advantageous in that they present excellent mechanical characteristics with a contained weight. This advantageous feature is, however, normally obtained at the expense of a greater constructional complexity with respect, for example, to a simple laminate, and at the expense of resistance to delamination (i.e., to the detachment of at least one <<skin>> from the central body), which may be critical and which depends upon the materials used, upon the care taken and upon the production process with which the sandwich laminate is made, as well as upon the type of stresses which the sandwich laminate undergoes (or may undergo) during use.

The resins normally used for making the <<skins>> of a sandwich laminate are polyester, vinyl ester or epoxy resins. Each one of these types of resins has qualities and defects which condition the possibility of them being used, in particular, in the boat-building field.

Polyester and vinyl ester are suited for being used for making the outer surface of a hull in that they afford, respectively, good impermeability and good resistance to osmosis. However, their mechanical and technological characteristics are modest; these resins are in fact brittle, and it is necessary to alternate cloth layers and layers of a filling material (known in the art of the branch as <<mat>>) which has poor mechanical characteristics and absorbs large amounts of resin.

Epoxy resins have better mechanical and technological characteristics (they do not require the use of <<mats>>) but are not suited for use in making the outer surface of a hull in that they do not possess good impermeability or resistance to osmosis; moreover they are not available on the market in the form of a waterproofing material, known in the state of the art as "gel coat", there do not exist <<mats>> that are compatible with epoxy resins, and epoxy resins cannot be associated to a polyester waterproofing gel coat because it is (practically) impossible to get an epoxy resin to adhere to a polyester or vinyl ester.

Both <<skins>> of the sandwich laminates currently known and normally used (in particular in the boat-building field) are made using the same type of resin (polyester/vinyl ester or epoxy resins). In fact, it is common experience among technicians operating in the sector of sandwich laminates that, if the <<skins>> are made with resins of different types, it is very difficult (if not practically impossible) to get two constructional elements made with sandwich laminates (such as the hull and deck of a boat) to adhere together in a watertight way and/or to seal the <<skins>> of a sandwich laminate together.

To overcome this limitation, there are currently on sale materials (known in the art as <<primers>>) which should favour adhesion between epoxy resins and polyester/vinyl ester resins, but the results obtainable using these materials are altogether unsatisfactory and unreliable, as has been experimentally ascertained by the applicant.

Making both of the <<skins>> of a sandwich laminate using the same type of resin (polyester/vinyl ester resin or epoxy resin) means, however, foregoing an adequate exploitation of the advantageous characteristics presented by each of the two types of resins, i.e., foregoing the numerous advantages (of a technical/constructional, economic nature, etc.) which may be achieved by making each <<skin>> of a sandwich laminate with the type of resin (polyester/vinyl ester resin or epoxy resin) which presents the characteristics best suited to the environment with which the said <<skin>> is to come into contact.

Long research studies and repeated experimental tests have enabled the applicant to overcome the limits and drawbacks described above by making a differentiated sandwich laminate, the <<skins>> of which are made using different resins (in particular a polyester/vinyl ester resin and an epoxy resin) and connecting together the two sandwich laminates made according to the invention, and/or the <<skins>> of the same sandwich laminate, using mechanical-assembly means.

SUMMARY OF THE INVENTION

The subject of the present invention is a differentiated sandwich laminate comprising a pair of layers of composite material applied to the opposite faces of a central body, in which the resin used to make one of the aforesaid layers is different from the one used to make the other layer and is incompatible with it.

Preferably one of the layers of composite material is made with a polyester/vinyl ester resin, whilst the other is made with an epoxy resin.

The layers of composite material of a sandwich laminate, or else of two or more adjacent sandwich laminates, are connected together in a watertight way using mechanical-assembly means.

LIST OF FIGURES

The invention will now be described in greater detail with reference to an example of embodiment given to provide a non-limiting illustration as shown in the attached figures, in which:

FIG. 1 presents an exploded cross section of a sandwich laminate made according to the invention;

In the attached figures, corresponding elements are designated with the same reference numbers.

DETAILED DESCRIPTION OF THE INVENTION

Figure 1:
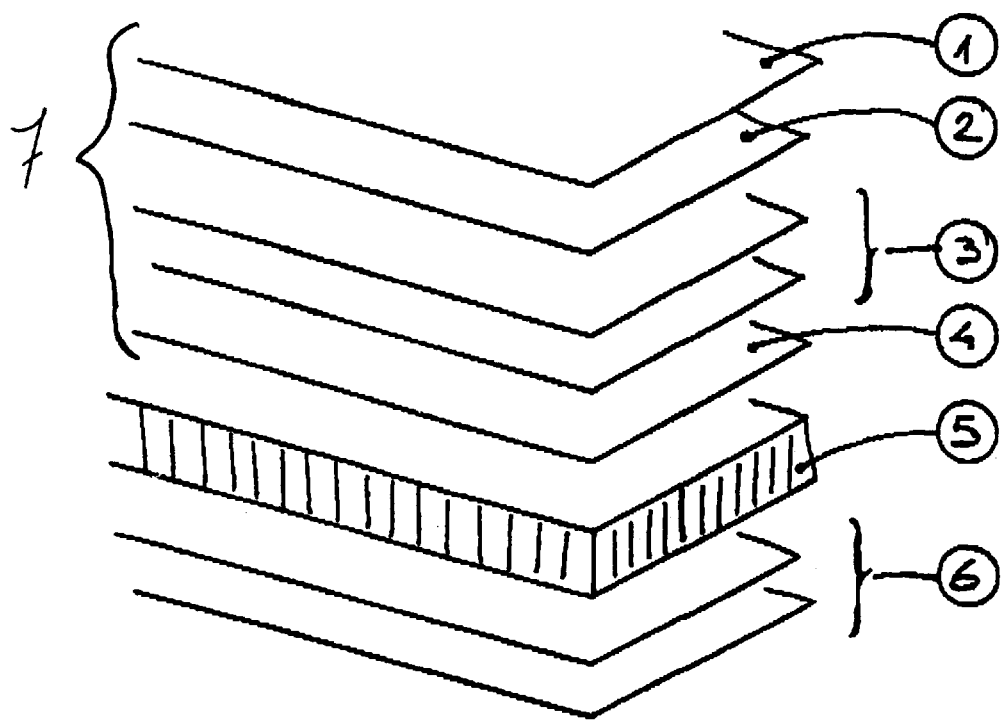

FIG. 1 presents an exploded cross section of a sandwich laminate made according to the invention, in which the resin used to make one of the layers (or <<skins>>) of the sandwich laminate is different from the one used to make the other layer (or <<skin>>) of the sandwich laminate and incompatible with it, i.e., such as not to enable the two <<skins>> to be glued together effectively in a lasting way. Preferably one of the layers of composite material is made with a polyester/vinyl ester resin, whilst the other layer is made with an epoxy resin.

The sandwich laminate illustrated in FIG. 1 comprises in order:

one outer layer 1 of polyester gel coat;

one layer 2 of polyester or vinyl ester resin;

a plurality 3 of layers of reinforcing material (<<mat>> and cloth alternated) impregnated with polyester or vinyl ester resin;

one layer 4 of a high-viscosity epoxy adhesive material;

the centre 5, glued—preferably vacuum-glued—to the layer 3 with the layer of adhesive material 4; and at least one layer of reinforcing material impregnated with epoxy resin, which constitutes the inner layer (or <<skin>>) 6 of the sandwich laminate forming the subject of the present invention.

The set of the layers 1–4 (indicated as a whole in the attached figures by 7) constitutes the outer layer (or <<skins>>) of the sandwich laminate. Preferably, but not necessarily:

the polyester gel coat consists of a commercially available product;

the polyester or vinyl ester resin has a viscosity of 750 MPa-s at 25° C.;

the reinforcing material used in making the layers 3 and 6 consists of Kevlar ® fabric, in carbon fibre or glass fibre, with mass per unit area of between 200 and 600 g/m$^2$;

the high-viscosity epoxy adhesive material consists of a mixture of Araldite and a binder, and has a viscosity of 0.03–0.045 MPa-s;

the centre 5 preferably consists of balsa wood, which, in areas that are subjected to high stresses, may be replaced by marine plywood or by another equivalent material;

the epoxy resin consists of a commercially available product.

The use of epoxy resin in the inner layer enables the layers of <<mat>> to be eliminated, with considerable advantages in terms of weight and sturdiness. In addition, also the elements that make up the internal structure of the boat (such as the ribs and longerons, designated by 11 in FIG. 2) may be made using fibres embedded in an epoxy matrix.

The sandwich laminate which forms the subject of the present invention thus makes it possible to exploit to the full both the better mechanical characteristics of the composite materials made with epoxy-resin matrices and the characteristics of impermeability and osmotic resistance of polyester/vinyl ester resin matrices, so obtaining lighter, more resistant and longer-lasting structures, as well as safer structures on account of the large thickness of the outer layer 7, which contains <<mat>>.

Figure 2:
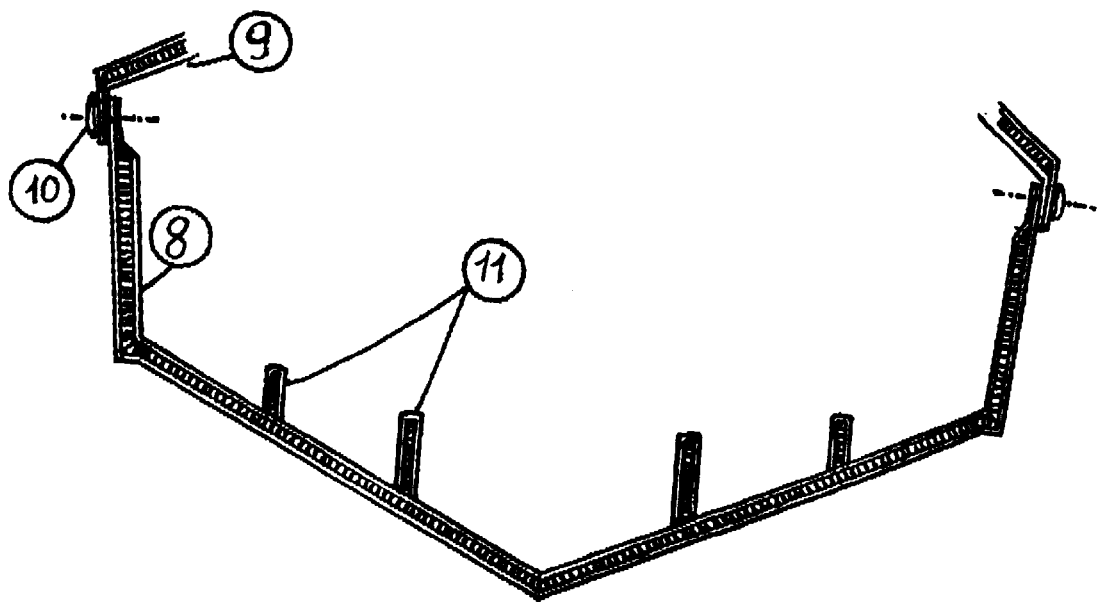
FIG. 2 shows a cross section of the hull and the deck of a boat assembled according to the invention.

FIG. 2 shows a cross section of a constructional element made by connecting together in a watertight way, using mechanical-assembly means, two sandwich laminates of the type described in FIG. 1.

Figure 3:
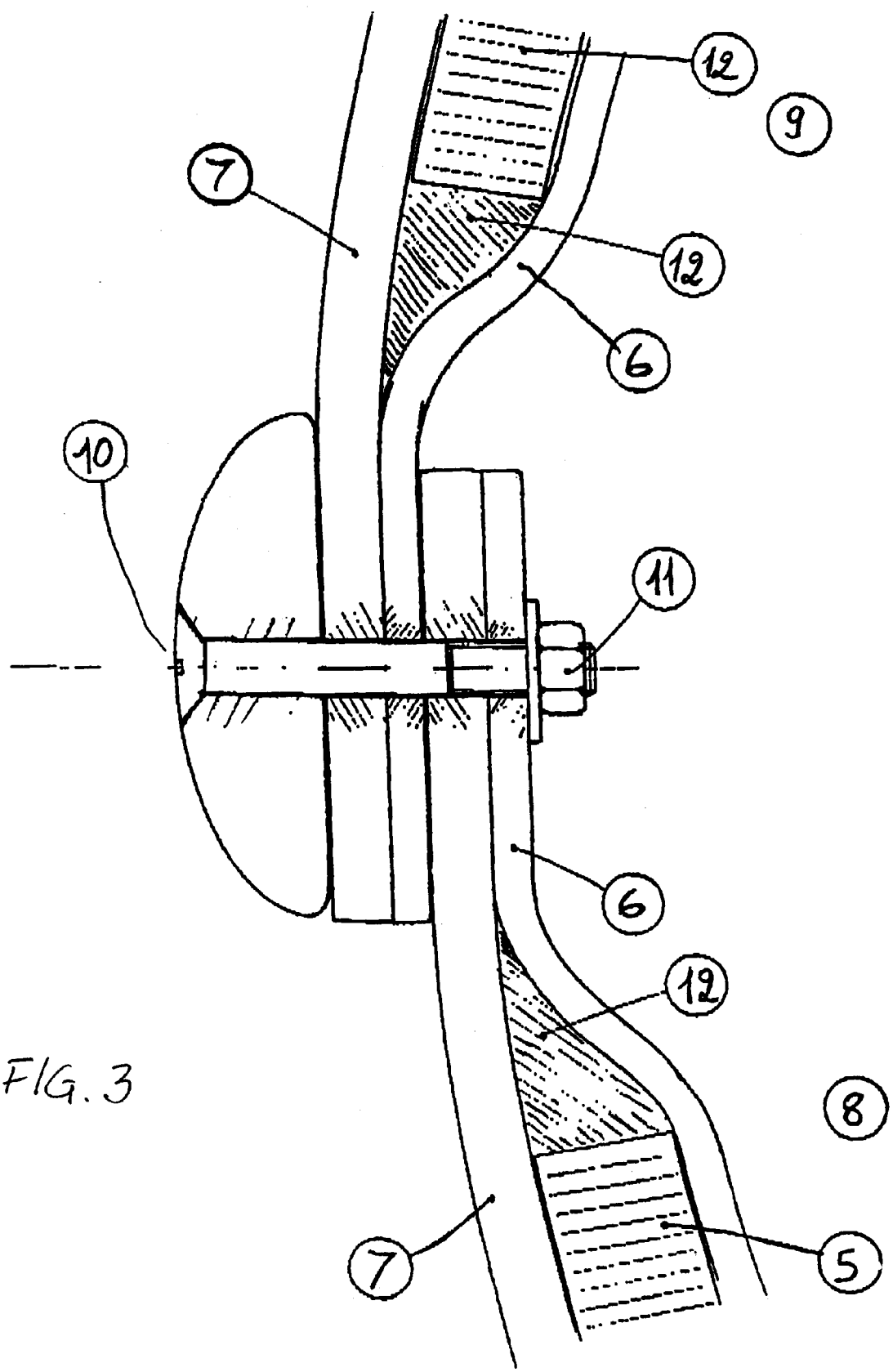
FIG. 3 shows an enlarged detail of the FIG. 2, with the aim of highlighting better the joining area between the hull and the deck.

In particular, FIG. 2 shows a cross section of the hull 8 and part of the deck 9 of a boat, assembled using mechanical-assembly means 10, which may be seen better in the enlarged detail of FIG. 3, where the following may be noted:

the centre 5 of each sandwich laminate does not extend up to the area of joining of the inner layer 6 and outer layer 7 of the structure itself;

preferably but not necessarily, the empty space which (in an area corresponding to the aforesaid joining area) remains between the outer layer 7 and the inner layer 6 of a sandwich laminate is filled with a filler 12 or another functionally equivalent inert filling material;

the outer layer 7 and inner layer 6 of each sandwich laminate are brought up together, gripped and fastened in a watertight way using mechanical-assembly means 10, and in any case without using a primer and/or other chemical adhesives;

the sandwich laminates according to the invention which constitute the hull 8 and the deck 9 are held together and sealed using mechanical-assembly means 10, and in any case without using a primer and/or other chemical adhesives.

In the example of embodiment of FIG. 3, the mechanical-assembly means 10 connect together in a watertight way both the outer layer 7 and the inner layer 6 of each sandwich laminate, as well as the sandwich laminates that make up the hull 8 and the deck 9; however, without departing from the scope of the invention, it is possible to connect together in a watertight way the outer layer 7 and the inner layer 6 of each sandwich laminate using mechanical-assembly means 10 distinct from the ones that connect in a watertight way the sandwich laminates that constitute the hull 8 and the deck 9.

Furthermore, in the example of embodiment of FIG. 3, the mechanical-assembly means 10 consist of bolts and their corresponding stop nuts 11, but, without departing from the scope of the invention, it is possible to use rivets and/or any other functionally equivalent mechanical-assembly means.

Again with departing from the scope of the invention, it is possible for a person skilled in the art to make to the differentiated sandwich laminate that forms the subject of the present description and/or to the mechanical-assembly means all the modifications and improvements suggested by normal experience and by the natural evolution of techniques.

What is claimed is:

1. Sandwich laminate comprising:

an outer layer (6) including a first resin;

an intermediate layer (5) having opposite faces; and an inner layer (7) including a second resin;
wherein each of said outer layer (6) and said inner layer (7) is composed of a composite material, with the composite material consisting of:
the first resin or the second resin, respectively; and
fibers composed of a chemically inert material, with the fibers being embedded in the first resin or the second resin, respectively;
wherein the outer layer (6) and the inner layer (7) are glued to the opposite faces of the intermediate layer (5);
wherein the first resin used to make the outer layer (6) is different from the second resin used to make the inner layer (7), and the first resin is incompatible with the second resin; and
wherein the outer layer (6) and the inner layer (7) extend over the dimensions of the intermediate layer (5) so that the outer layer (6) and the inner layer (7) are reciprocally connected on the perimeter of the sandwich laminate.

2. Sandwich laminate as per claim 1, wherein at least one of the outer layer (6) and the inner layer (7) is watertight; and
wherein the outer layer (6) and the inner layer (7) are reciprocally connected by mechanical-assembly means (10) to form a watertight combination of the layers (6, 7).

3. Sandwich laminate as per claim 2, wherein the mechanical-assembly means (10) consist of rivets.

4. Sandwich laminate as per claim 2, wherein the mechanical-assembly means (10) consist of bolts and corresponding stop nuts (11).

5. Sandwich laminate as per claim 1, further comprising:
an inert filling material (12) disposed in a space between the aforesaid layers (6, 7) belonging to the sandwich laminate and not occupied by the intermediate layer (5).

6. Sandwich laminate as per claim 1, wherein the outer layer (7) includes the first resin which includes a polyester resin and/or a vinyl resin; and
the inner layer (6) includes the second resin including an epoxy resin.

7. Sandwich laminate as per claim 6, wherein it comprises, in order, at least:
a) the outer layer (6) including:
a1) a layer (2) of a first material including a polyester resin and/or a vinyl resin;
a2) a plurality (3) of layers of reinforcing material impregnated with a second material including a polyester resin and/or a vinyl resin; and
a3) a layer (4) of epoxy-based adhesive material;
b) the intermediate layer (5); and
c) the inner layer (7) including at least one layer of reinforcing material impregnated with epoxy resin.

8. Sandwich laminate as per claim 7, wherein the intermediate layer (5) is vacuum glued to the outer layer (7) of the sandwich laminate by means of the aforesaid layer of adhesive material (4).

9. Constructional element made by assembling at least two sandwich laminates as per claim 1, wherein the said sandwich laminates are reciprocally connected by mechanical-assembly means (10) to form a watertight combination of the sandwich laminates.

10. Constructional element as per claim 9, wherein the mechanical-assembly means (10) consist of rivets.

11. Constructional element as per claim 9, wherein the mechanical-assembly means (10) consist of bolts and corresponding stop nuts (11).

* * * * *